(12) United States Patent
Xu

(10) Patent No.: US 10,656,435 B2
(45) Date of Patent: May 19, 2020

(54) SYSTEM FOR IMAGING IN THE AIR

(71) Applicant: Futurus Technology Co., Ltd., Beijing (CN)

(72) Inventor: Junfeng Xu, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 16/017,020

(22) Filed: Jun. 25, 2018

(65) Prior Publication Data

US 2018/0299686 A1 Oct. 18, 2018

Related U.S. Application Data

(63) Continuation of application No. 15/398,194, filed on Jan. 4, 2017.

(30) Foreign Application Priority Data

Dec. 8, 2016 (CN) .................... 2016 1 11240031

(51) Int. Cl.
*G02B 30/56* (2020.01)
*G03B 21/00* (2006.01)
(Continued)

(52) U.S. Cl.
CPC ............. *G02B 30/56* (2020.01); *G02B 5/124* (2013.01); *G02B 5/128* (2013.01); *G02B 27/14* (2013.01); *G02B 30/00* (2020.01); *G03B 21/00* (2013.01)

(58) Field of Classification Search
CPC .... G02B 27/2292; G02B 5/124; G02B 5/128; G02B 27/14; G02B 27/0172; G02B 5/136
(Continued)

(56) References Cited

U.S. PATENT DOCUMENTS 5,861,993 A * 1/1999 Shanks .................. G02B 5/124
359/629
6,379,009 B1 * 4/2002 Fergason ............. G02B 27/017
345/9
(Continued)

FOREIGN PATENT DOCUMENTS

CN         101315465 A    12/2008
CN         102789121 A    11/2012
(Continued)

OTHER PUBLICATIONS

International Search Report and Written Opinion dated Feb. 26, 2018 from State Intellectual Property Office of the P.R. China.
(Continued)

*Primary Examiner* — Jade R Chwasz
(74) *Attorney, Agent, or Firm* — Dilworth & Barrese, LLP.; Michael J. Musella, Esq.

(57) ABSTRACT

A system for imaging in the air including an image source, a transflector, and a retroreflective element. Light rays emitted by the image source are reflected by the transflector to irradiate on the retroreflective element, and are subjected to reflection on the retroreflective element, before being emitted along an original incident path in an opposite direction and being transmitted through the transflector to form a real image. By means of the present system, it is possible to directly present images in the air, even in vacuum, without the aid of any medium.

23 Claims, 6 Drawing Sheets

(51) Int. Cl.
*G02B 30/00* (2020.01)
*G02B 5/124* (2006.01)
*G02B 5/128* (2006.01)
*G02B 27/14* (2006.01)

(58) Field of Classification Search
USPC .................. 359/479, 478, 529, 530, 534
See application file for complete search history.

(56) References Cited

U.S. PATENT DOCUMENTS

| | | | |
|---|---|---|---|
| 6,798,579 B2 * | 9/2004 | Robinson | G02B 17/0621 |
| | | | 348/E9.012 |
| 7,133,207 B2 | 11/2006 | Travers | |
| 2009/0073552 A1 | 3/2009 | Yokoi | |
| 2009/0232509 A1 * | 9/2009 | Heikenfeld | G02B 5/124 |
| | | | 398/118 |
| 2015/0103392 A1 | 4/2015 | Rieger | |
| 2016/0291326 A1 | 10/2016 | Evans et al. | |
| 2018/0024373 A1 * | 1/2018 | Joseph | G02B 27/22 |
| | | | 359/629 |
| 2018/0259810 A1 * | 9/2018 | Numata | G02F 1/133514 |

FOREIGN PATENT DOCUMENTS

| | | |
|---|---|---|
| CN | 103116422 A | 5/2013 |
| CN | 203217230 U | 9/2013 |
| CN | 103901706 A | 7/2014 |
| CN | 104977794 A | 10/2015 |
| CN | 105372926 A | 3/2016 |

OTHER PUBLICATIONS

Office Action from Parent U.S. Appl. No. 15/398,194 dated Jun. 27, 2017.

* cited by examiner

SYSTEM FOR IMAGING IN THE AIR

CROSS REFERENCE TO RELATED APPLICATION

This application is a continuation of U.S. application Ser. No. 15/398,194, filed on Jan. 4, 2017, which claims priority to CN Application No. 2016111240031, filed on Dec. 8, 2016, the entire contents of which are incorporated herein by reference.

FIELD OF THE DISCLOSURE

The embodiments of the present invention relate to the field of holographic imaging, and more particularly to a system for imaging in the air.

BACKGROUND OF THE DISCLOSURE

Holography is a technology of recording and reproducing a real three-dimensional image of an object by means of interference and diffraction principles.

A conventional holographic imaging method is to produce holographic images using the principle of laser interference. Light emitted by a laser source is divided into two beams, one of which irradiates directly towards a photosensitive film and the other of which is reflected by an object to be shot before irradiating towards the photosensitive film. The two beams of light are superimposed on the photosensitive film to produce interference. Finally, the reproduced hologram is further processed according to the basic principle of digital images to remove digital interference, thereby obtaining a clear holographic image. This method has the disadvantages of strict monochromatic requirement and great difficulty in realization of color imaging.

Existing holographic imaging technologies are generally classified into the following three types.

The first type depends on virtual reality or augmented reality glasses or helmet, such as Microsoft's HoloLens, etc. This type of technology has limited application scenarios and currently high costs, due to a need for dependence on auxiliary instrument.

The second type, in dependence on a reflector in high-speed rotation and a projector with high-speed refreshing, is projecting an image on the reflector in high-speed rotation so as to realize a three-dimensional image. The patent document CN105372926A discloses a rotary holographic projection display cabinet utilizing such technology. This technology can hardly achieve interaction, and has very harsh requirements for space.

The third type, in dependence on medium containing fine particles, such as air comprising water vapor, is projecting an image on small water droplets formed by liquefaction of the water vapor. Due to molecular vibration disparity, an image with a strong sense of hierarchy and stereoscopic vision can be formed. The patent documents CN104977794A and CN103116422A disclose application of such technology, both using a water vapor curtain wall to form an image in the air. Application of such technology still involves a need to be equipped with auxiliary tools, for the production of a water vapor curtain wall. Thus, it is not quite convenient to use the third type of technology.

In general, the above technologies, which are imaging in virtual reality or augmented reality tools, imaging in a reflector in high-speed rotation, or imaging in vapor particles in the air, is not imaging in the air in a true sense.

SUMMARY OF THE EMBODIMENTS OF THE PRESENT INVENTION

The embodiments of the present invention, which aim to overcome the deficiencies of the technologies described above, provides a true system and method of imaging in the air, enabling imaging directly in the air without any special medium, or even imaging in vacuum. This greatly broadens the range of applications, is no longer restricted by auxiliary tools, and brings a revolutionary breakthrough to an existing human-computer interaction scenario.

In accordance with an aspect of the present invention, a system for imaging in the air is providedthat includes an image source, a transflector and an retroreflective element, wherein, light rays emitted by the image source are reflected by the transflector to irradiate on the retroreflective element, and are subjected to reflection on the retroreflective element, before being emitted along an original incident path in an opposite direction and being transmitted through the transflector to form a real image.

In accordance with another aspect of the present invention, a system for imaging in the air is providedthat includes an image source, a transflector, and an retroreflective element, wherein, light rays emitted by the image source are transmitted through the transflector to irradiate on the retroreflective element, and are subjected to reflection on the retroreflective element, before being emitted along an original incident path in an opposite direction and being reflected by the transflector to form a real image.

According to yet another aspect of the present invention, a system for imaging in the air is providedthat includes an image source, a transflector, a first retroreflective element and a second retroreflective element, wherein, light rays emitted by the image source are reflected by the transflector to irradiate on the first retroreflective element, and are subjected to reflection on the first retroreflective element, before being emitted along an original incident path in an opposite direction and being transmitted through the transflector to form a first real image; and additionally, the light rays emitted by the image source are transmitted through the transflector to irradiate on the second retroreflective element, and are subjected to reflection on the second retroreflective element, before being emitted along an original incident path in an opposite direction and being reflected by the transflector to form a second real image.

In accordance with another aspect of the present invention, a system for imaging in the air is providedthat includes a first image source, a second image source, a transflector, and an retroreflective element, wherein, light rays emitted by the first image source are reflected by the transflector to irradiate on the retroreflective element, and are subjected to reflection on the retroreflective element, before being emitted along an original incident path in an opposite direction and being transmitted through the transflector to form a first real image; light rays emitted by the second image source are transmitted through the transflector to irradiate on the retroreflective element, and are subjected to reflection on the retroreflective element, before being emitted along an original incident path in an opposite direction and being reflected by the transflector to form a second real image; and positions of the first image source and the second image source are configured so that the first real image and the second real image are formed at a same position.

Preferably, the image sources are imaging devices that emit virtual images or real images, or virtual images or real images formed by these devices.

Preferably, the light source of the image source is one or more of a laser, a light-emitting diode, an organic light-emitting diode, and a stimulated fluorescent light-emitting material.

Preferably, transmittance of the transflector is in the range of about 20% to about 80%.

Preferably, reflectance of the transflector is in the range of about 20% to about 80%.

In a preferred embodiment, the retroreflective element comprises a substrate with a reflective face, and a microstructure disposed on the substrate.

Preferably, the microstructure is a right-angle vertex microstructure made of a transparent material, wherein the right-angle vertex microstructure has at least one right-angle vertex whose three edges are at right angles to each other.

Preferably, the microstructure is a recess containing a right-angle vertex microstructure, where the right-angle vertex microstructure has at least one right-angle vertex whose three edges are at right angles to each other.

Preferably, the microstructure is a spherical microstructure made of a transparent material.

Preferably, the reflective face is formed on a face of the substrate facing the microstruture.

Preferably, the reflective face is formed at an interface of the substrate and the microstructure.

Preferably, the microstructure and the substrate are integrally formed by the same transparent material, the right-angle vertex protrudes outwardly and the reflective face is formed on three faces formed in a manner that the three edges of the right-angle vertex intersect each other.

Preferably, the microstructure is uniformly distributed over the substrate.

Preferably, the substrate is a film, a curtain or a plate.

In another preferred embodiment, the retroreflective element includes a plurality of retroreflective units.

Preferably, the retroreflective units include a microstructure with a reflective face.

Preferably, the microstructure is a right-angle vertex microstructure made of a transparent material, where the right-angle vertex microstructure has at least one right-angle vertex whose three edges are at right angles to each other, and three faces formed in a manner that the three edges intersect each other or at least their partial regions form the reflective face.

Preferably, the microstructure is a recess containing a right-angle vertex microstructure, where the right-angle vertex microstructure has at least one right-angle vertex whose three edges are at right angles to each other, and three faces formed in a manner that the three edges intersect each other or at least their partial regions form the reflective face.

Preferably, the microstructure is a spherical microstructure made of a transparent material, where a part of surface of the spherical microstructure, more distant from the transflector, forms a reflective face.

Preferably, the reflective face of the microstructure is attached to or formed integrally with a substrate, where the substrate can be used to carry the retroreflective element.

Preferably, a face other than the reflective face of the microstructure is attached to or formed integrally with a transparent substrate, where the substrate can be used to carry the retroreflective element.

In yet another preferred embodiment, the retroreflective element also includes a plurality of retroreflective units.

Preferably, the retroreflective units include one of a first material and a second material, and the retroreflective units further include a reflective face, where, the first material is a transparent solid material; the first material, as viewed from an incident path of the light rays, is positioned in front of the reflective face, and the light rays are incident through the first material and then are reflected by the reflective face, before being further emitted from the first material; and the second material, as viewed from the incident path of the light rays, is positioned rearward of the reflective face.

Preferably, the retroreflective units comprise a first material and a second material, and the retroreflective units further comprise a reflective face, wherein, the first material is air or vacuum, and the second material is a film, a curtain or a plate; the first material, as viewed from the incident path of the light rays, is positioned in front of the reflective face, and the light rays are incident through the first material and then are reflected by the reflective face, before being further emitted from the first material; and the second material, as viewed from the incident path of the light rays, is positioned rearward of the reflective face.

Preferably, the reflective face is three faces formed in a manner that three edges of the right-angle vertex intersect each other or at least their partial regions, wherein the three edges of the right-angle vertex are at right angles to each other.

Preferably, the reflective face is a part of a surface of a sphere, and the center of the sphere is positioned in front of the reflective face, as viewed from the incident path of the light rays.

Preferably, the second material is a film, a curtain or plate.

Preferably, the three edges of the right-angle vertex are of equal length.

Preferably, the reflective face is attached with a highly reflective material.

Preferably, the reflectance of the highly reflective material is more than 60%, 70%, 80%, or 90%.

Preferably, the highly reflective material is attached on the reflective face by spray coating or filming.

Preferably, the retroreflective element has a curvature bent towards the transflector.

Preferably, the microstructure is uniformly distributed over the retroreflective element.

Preferably, the image source is a stereoscopic image source.

Preferably, the stereoscopic image source is a three-dimensional stereoscopic display device that can display three-dimensional stereoscopic images, structures, and video sources.

Preferably, the three-dimensional stereoscopic display device includes a translational scan imaging system or a rotational scan imaging system.

Preferably, one of two faces of the transflector is attached with a transflective material such that the reflectance is between about 20% and about 80% and corresponding transmittance is between about 80% and about 20%.

Preferably, the face of the two faces of the transflector, which is not attached with a transflective material, is attached with an antireflective material.

Preferably, the three edges each have a length between about 5 mm and about 20 mm.

Preferably, the longest edge length of the three edges does not exceed 10 times the shortest edge length.

Preferably, when the first material is a transparent solid material, its incidence face is attached with an antireflection material.

Preferably, when the first material is a transparent solid material, its incident face is a plane.

Preferably, at least one of three faces formed by the three edges has an angle of less than 54 degrees from the incident face.

According to a major of the present invention, a method for imaging in the air is provided that includes the steps of providing an image source, a transflector and a retroreflective element; reflecting, by the transflector, light rays emitted by the image source, to irradiate on the retroreflective element; and subjecting the light rays to reflection on the retroreflective element, before being emitted along an original incident path in an opposite direction and being transmitted through the transflector to form a real image.

According to another aspect of the present invention, a method for imaging in the air is providedthat includes the steps of providing an image source, a transflector and a retroreflective element; transmitting, through the transflector, light rays emitted by the image source, to irradiate on the retroreflective element; and subjecting the light rays to reflection on the retroreflective element, before being emitted along an original incident path in an opposite direction and being reflected by the transflector to form a real image.

According to yet another aspect of the present invention, a method for imaging in the air is providedthat includes the steps of providing an image source, a transflector, a first retroreflective element and a second retroreflective element; reflecting, by the transflector, light rays emitted by the image source, to irradiate on the first retroreflective element, and transmitting, through the transflector, the light rays emitted by the image source, to irradiate on the second retroreflective element; subjecting the light rays to reflection on the first retroreflective element, before being emitted along an original incident path in an opposite direction and being transmitted through the transflector to form a first real image, and subjecting the light rays to reflection on the second retroreflective element, before being emitted along an original incident path in an opposite direction and being reflected by the transflector to form a second real image.

According to another aspect of the present invention, a method for imaging in the air is providedthat includes the steps of providing a first image source, a second image source, a transflector, and an retroreflective element; reflecting, by the transflector, light rays emitted by the first image source, to irradiate on the retroreflective element, and transmitting, through the transflector, light rays emitted by the second image source, to irradiate on the retroreflective element; subjecting the light rays emitted by the first image source to reflection on the retroreflective element, before being emitted along an original incident path in an opposite direction and being transmitted through the transflector to form a first real image, and subjecting the light rays emitted by the second image source to reflection on the retroreflective element, before being emitted along an original incident path in an opposite direction and being reflected by the transflector to form a second real image; and configuring positions of the first image source and the second image source, such that the first real image and the second real image are formed at substantially the same position. A person of ordinary skill in the art will readily understand that a positioning tolerance for the first and second real images is acceptable, as long as the two images are close enough not to be distinguished by human eyes.

The embodiments of the present invention innovatively utilizes e.g., a retroreflective film and a transflective mirror in combination to transform a virtual image into a real image, thereby realizing imaging in the air. Advantages of the embodiments of the present inventionare: images can be presented directly in air, even in vacuum, without the aid of any medium (e.g., screen, gas or liquid containing fine particles, etc.); several persons can view the images at the same time, without the aid of other auxiliary equipment such as helmets, glasses, etc.; and in addition, the images are floating in the air, and can be touched directly by hands, thus making it impossible to extend a lot of interactive applications.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. These drawings are not to be construed as limiting the invention, but are illustrative.

DETAILED DESCRIPTION OF THE EMBODIMENTS OF THE PRESENT INVENTION

In order to make the object, technical solutions and advantages of the present invention clearer, the present invention will be further described in detail with reference to the accompanying drawings.

For purposes of descriptive brevity and intuition, the following disclosure will illustrate the solutions of the present invention by describing a number of representative embodiments. Numerous details in the embodiments are provided solely to aid in understanding the solutions of the present invention. However, it is quite apparent that the technical solutions of the present invention, when in implementation, are allowed not to be confined to these details. In order to avoid unnecessarily obscuring the solutions of the present invention, some embodiments will not be described in detail, but only a framework is presented. In the following disclosure, "comprise (include)" means "include, but is not limited to", and "according to (in accordance with) . . . " means "at least according to (in accordance with) . . . , but is not limited to only according to . . . ". The words "first", "second" and the like are used only for reference to features, and are not intended to impose any limitation on the features, such as limitation on sequence. Owing to language conventions of the Chinese language, when the following disclosure does not particularly specify the number of a component, it is meant that the component can be one or more in number, or can be understood as at least one.

Figure 1:
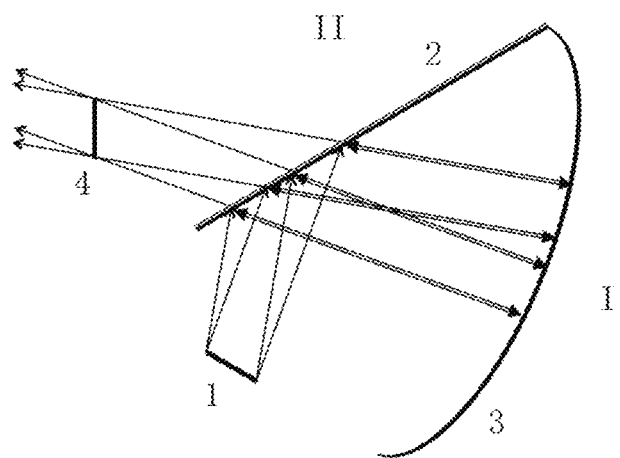
FIG. 1 schematically shows an imaging system according to an embodiment of the present invention.

FIG. 1 shows an imaging system according to an embodiment of the present invention. As shown in FIG. 1, the system comprises an image source 1, a transflector 2 and a retroreflective element 3. The plane at which the transflector 2 is located divides space into a first semi-region I and a second semi-region II; and both the image source 1 and the retroreflective element 3 are in the first semi-region I.

Light rays emitted by the image source 1 are reflected by the transflector 2 to irradiate on the retroreflective element 3. The light rays are subjected to retroreflection on the retroreflective element 3 so that reflected light rays on the retroreflective element 3 and the incident light rays utilize the same path and simply are opposite in directions. Thus, after being reflected by the retroreflective element 3, the light rays are emitted along an original incident path (it should be understood, from a microscopic view, it can be considered that the reflective path and the incident path are slightly offset from each other; however, from a macroscopic view, it can be considered that the two paths are totally coincident), and are then transmitted through the transflector, to form a real image 4 in the second semi-region II.

The image source 1 can be image displaying devices, and can also be a virtual image or a real image formed by these image displaying devices.

For example, the image displaying device can be a liquid crystal screen, and a backlight light source of the liquid crystal screen includes one or more of a laser, a light emitting diode, an organic light emitting diode, a stimulated fluorescent light emitting material, and a quantum dot stimulation light source. The image displaying device can also be a lattice screen which is formed by light-emitting point light sources such as LED, OLED, and plasma light emitting point and emits light on its own. The image displaying device may also be a projection imaging system in which light, driven by light sources such as LED, OLED, laser and fluorescence, or a combination thereof, is reflected by or transmitted through display panels such as DMD, LCOS and LCD, and then projected on the projection screen via projecting lens for imaging on the basis of projection techniques such as DLP, LCOS and LCD. The image displaying device can also be a projection imaging system in which laser beams scan and image on the screen. Moreover, in all the image displaying devices described above, a real image or virtual image formed by one or more refractions or reflections may also be used as an image source.

In preferred embodiments, the image source 1 may be a stereoscopic image source. The stereoscopic image source includes a three-dimensional stereoscopic display device which can display 3D stereoscopic images, structures, and video sources. The three-dimensional stereoscopic display device generally comprises a control module and a high-speed projection module or a high-speed display module. The control module is configured to control the projection module or the display module to project or display a series of 2D image slices at high speed to a plurality of optical planes, such that an observer observes a three-dimensional stereoscopic image, structure, or video. The three-dimensional stereoscopic display device includes a translational scan imaging system, a rotational scan imaging system, and the like.

The transflector may be made of a variety of suitable transparent materials, such as PC resin, PET resin, PMMA resin, glass, quartz and the like. The transmittance of the transflector is between about 20% and about 80%, preferably, about 50%. The reflectance of the transflector is also between about 20% and about 80%, preferably, also about 50%. A person of ordinary skill in the art will readily understand that the word "about" means plus or minus 10% of the numerical value it modifies.

The retroreflective element 3 is preferably a thin film, curtain or a plate distributed with a microstructure, which preferably has a curvature bent towards the transflector, thereby making it possible to increase the brightness of the resulted image. The following disclosure will describe in detail the retroreflective element 3.

Figure 2:
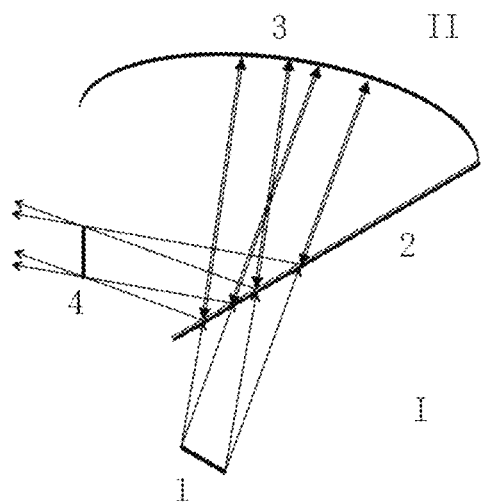
FIG. 2 schematically shows an imaging system according to another embodiment of the present invention.

Referring to FIG. 2, in another embodiment of the present invention, the system comprises an image source 1, a transflector 2 and a retroreflective element 3. The plane at which the transflector 2 is located divides space into a first semi-region I and a second semi-region II. The image source 1 is located at the first semi-region I, whereas the retroreflective element 3 is located at the second semi-region II.

Light rays emitted by the image source 1 are transmitted through the transflector 2 to irradiate on the retroreflective element 3. The light rays are subjected to retroreflection on the retroreflective element 3 so that reflected light rays on the retroreflective element 3 and the incident light rays utilize the same path and simply are opposite in directions. Thus, after being reflected by the retroreflective element 3, the light rays are emitted along an original incident path, and are then reflected by the transflector, to form a real image 4 in the second semi-region II.

It is to be understood that, due to wave-particle duality of light, there is a certain diffraction effect when the light rays are reflected from the retroreflective element 3, and a certain divergence angle is generated by the reflected light. When taking this into account, as long as the main axis of the reflected light and the incident light are opposite in directions, the meaning of "retroreflection" according to the present invention is also satisfied.

In this embodiment, the light rays emitted by the image source 1 are transmitted (not reflected by) through the reflector mirror 2, before reaching the retroreflective element 3. The light rays reflected by the retroreflective element 3 are reflected (but not transmitted through) by the transflector 2, to generate a real image 4. The finally generated real image 4 and the retroreflective element 3 are located at a same semi-region, rather than at different semi-regions.

Figure 10:
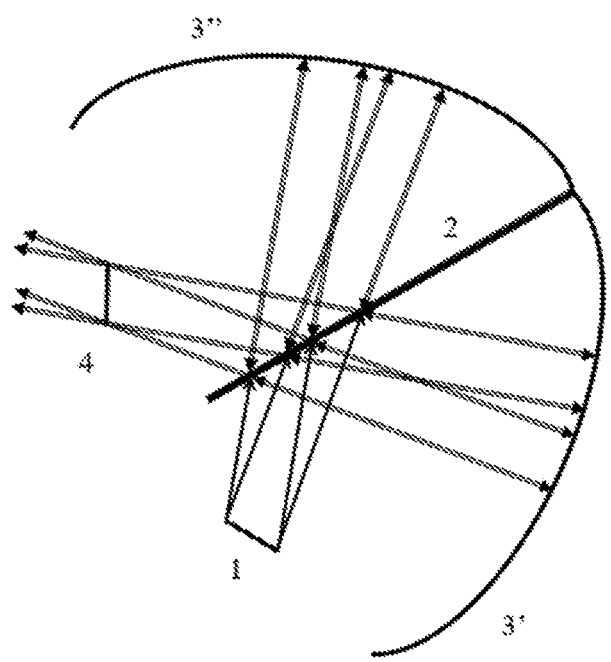
FIG. 10 schematically shows an imaging system according to further another embodiment of the present invention.

In one embodiment of the present invention (see FIG. 10), the two embodiments described above are combined in a way of employing two retroreflective elements 3' and 3", such that the light rays emitted by the image source 1 are reflected by the transflector 2, before reaching one of the retroreflective elements 3' and 3"; and the light rays reflected by the retroreflective element 3' are further transmitted through the transflector 2 to generate a real image. The light rays emitted by the image source are transmitted through the transflector 2 to reach the other retroreflective element 3", and the light rays reflected by the other retroreflective element 3" are further reflected by the transflector 2, to generate a real image. As such, the two generated images overlap, thereby obtaining an image with greater brightness.

Of course, it should be understood that, in other embodiments, additionally or alternatively, two image sources may be used. In this case, it is necessary to adjust the positions of the two image sources, and the transflector and the retroreflective elements, so that the finally generated real images overlap in space.

The retroreflective element of the present invention is a specially treated element comprising, e.g., a substrate coated with a highly reflective coating, and, a retroreflective microstructure, e.g., uniformly distributed on the substrate. The highly reflective coating has a reflectance of 60% or more, preferably more than 70%, 80%, or 90%. It should be appreciated that the highly reflective coating may also be attached to the substrate in other manners, such as, for example, filming.

Of course, the highly reflective coating may, for example, be attached to the face of the microstructure facing the substrate, or to the interface of the microstructure and the substrate.

It is to be understood that the distribution of the retroreflective microstructure on the substrate may also be non-uniform, and uniform distribution will have a better imaging effect. However, some deliberately arranged non-uniform distribution may be used for particular imaging purposes.

Figure 3:
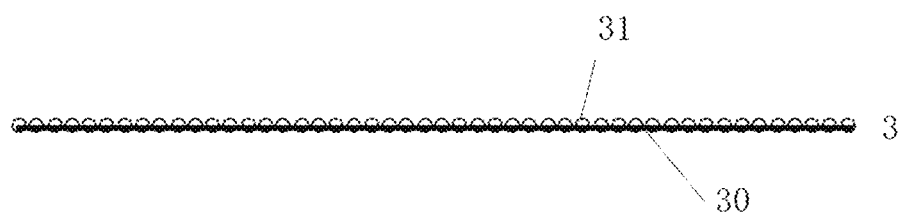
FIG. 3 schematically shows a retroreflective element according to an embodiment of the present invention.

Referring to FIG. 3, there is shown an retroreflective element according to an embodiment of the present invention. The retroreflective element 3 includes a film or a curtain as a substrate 30. The substrate 30 is coated with a highly reflective coating. In addition, spherical microstructures 31 are uniformly distributed on the substrate 30.

Figure 4:
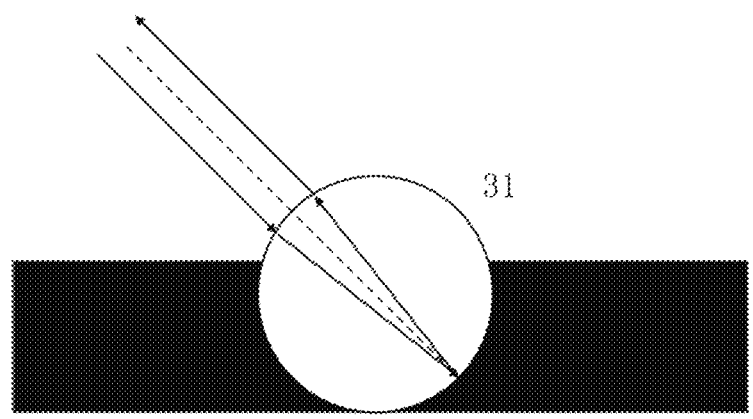
FIG. 4 schematically shows a microstructure of a retroreflective element and a retroreflective path according to an embodiment of the present invention.

Referring to FIG. 4, there are shown an enlarged view of a spherical microstructure and a schematic diagram of a retroreflective path.

Light rays are refracted from the transflector through an upper surface of a spherical microstructure 31 to irradiate towards a highly reflective coating of a substrate 30. After being reflected, the light rays irradiate back onto the upper surface of the spherical microstructure 31 and are refracted again to irradiate towards the transflector. The spherical microstructure 31 is structured so that the light rays can be returned to the transflector almost via the original path (as previously described, it can be considered that the light rays, when viewed in a macroscopic environment, are returned just along the original path).

Figure 5:
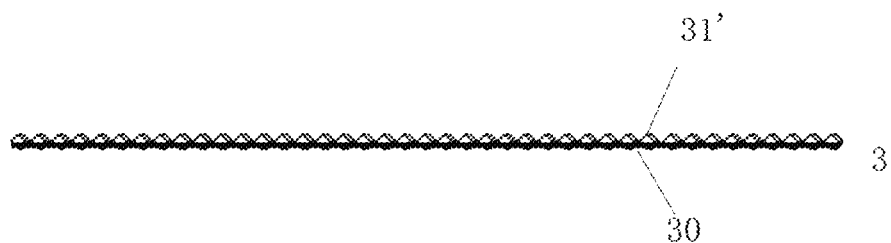
FIG. 5 schematically shows a retroreflective element according to another embodiment of the present invention.

Referring to FIG. 5, there is shown a retroreflective element according to another embodiment of the present invention. A substrate 30 of the retroreflective element 3 is also uniformly distributed with a right-angle vertex microstructure 31'. The right-angle vertex microstructure 31' may be a transparent microstructured body, such as a microcube or a microcuboid, which is embedded on the substrate 30 and has at least one vertex whose three edges are at right angles to each other, or a part thereof containing at least one vertex. Of course, the at least one vertex is embedded in the substrate 30 (see FIG. 6A). In some embodiments, the right-angle vertex microstructure 31' is a micro-triangular pyramid, with three edges at right angles to each other, where the vertex is embedded in the substrate 30 (see FIG. 6B); preferably, a bottom face opposite to the vertex is flush with the substrate 30; and more preferably, an antireflective film is further attached to the bottom face. In a more preferred embodiment, at least one of three faces formed by the three edges has an angle of less than 54 degrees from the bottom face.

It should be understood that, the three edges can be of equal length, and certainly can be of unequal lengths. The lengths of the edges can be selected from between about 5 mm and about 20 mm. Preferably, the longest edge length of the three edges does not exceed 10 times the shortest edge length.

It should also be understood that the three faces formed by the three edges should also be perpendicular to each other, i.e., the dihedral angles between any two of the three faces each should be 90 degrees; however, due to the constraints of the art, even if these dihedral angles are not precisely 90 degrees, but within a processing tolerance range of, for example, ±2 minutes (please verify), requirements of the present invention can also be satisfied.

Figure 6A:
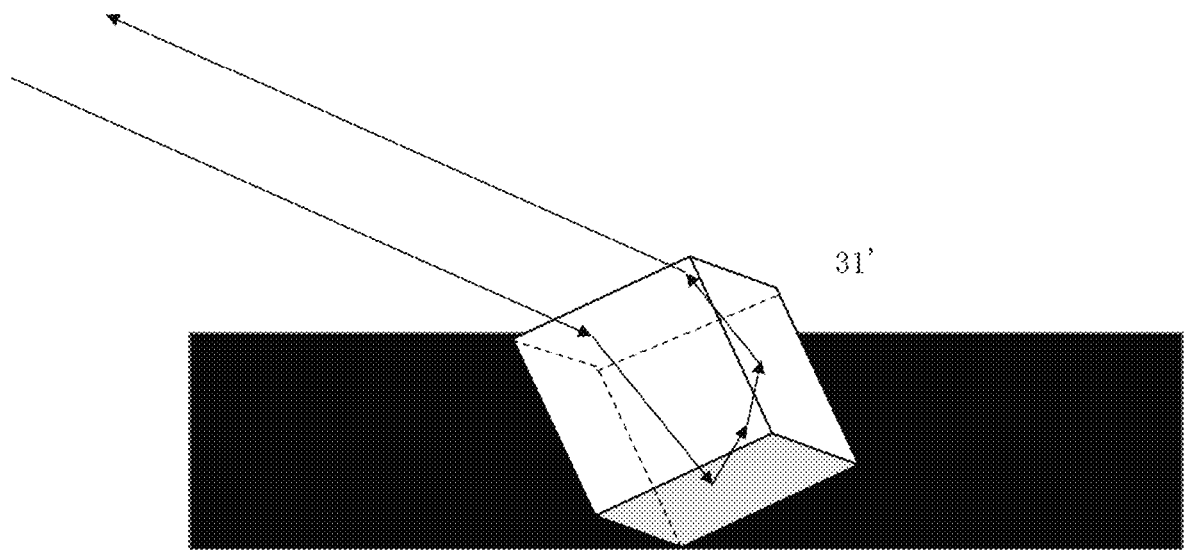
FIGS. 6A, 6B and 6C schematically show a microstructure of a retroreflective element and a retroreflective path according to another embodiment of the present invention.
Figure 6B:
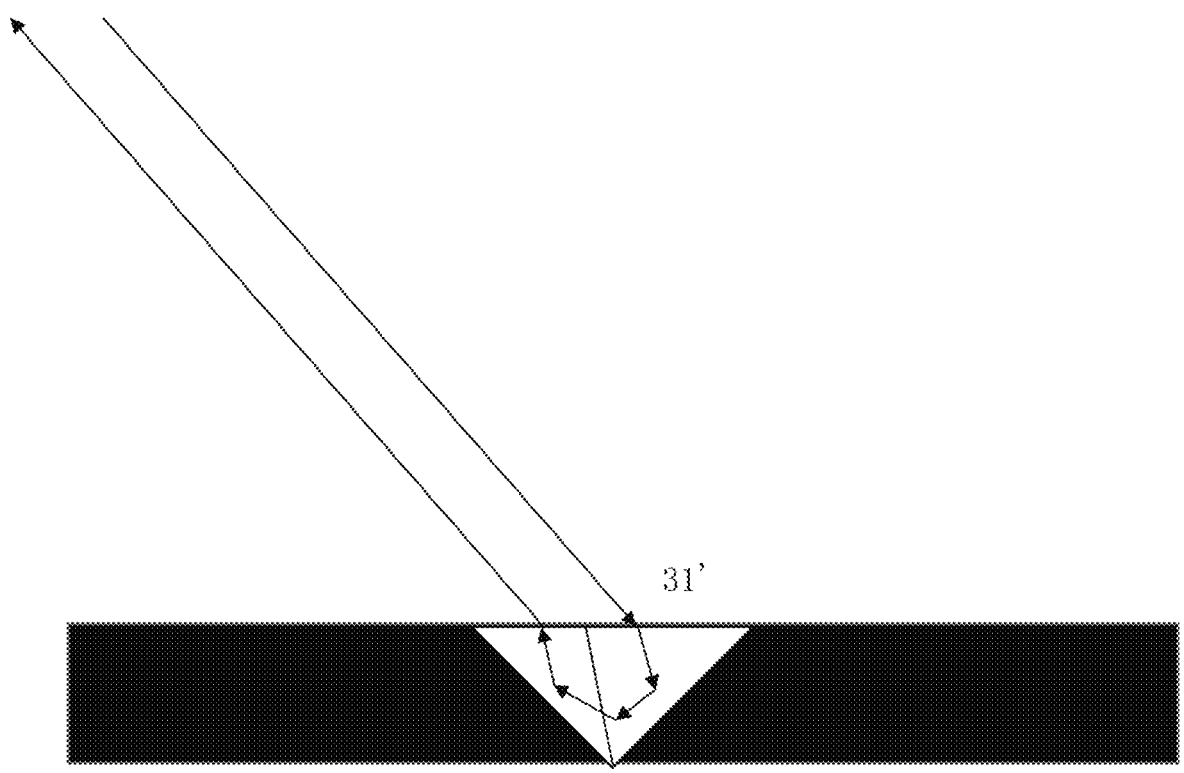
Figure 6C:
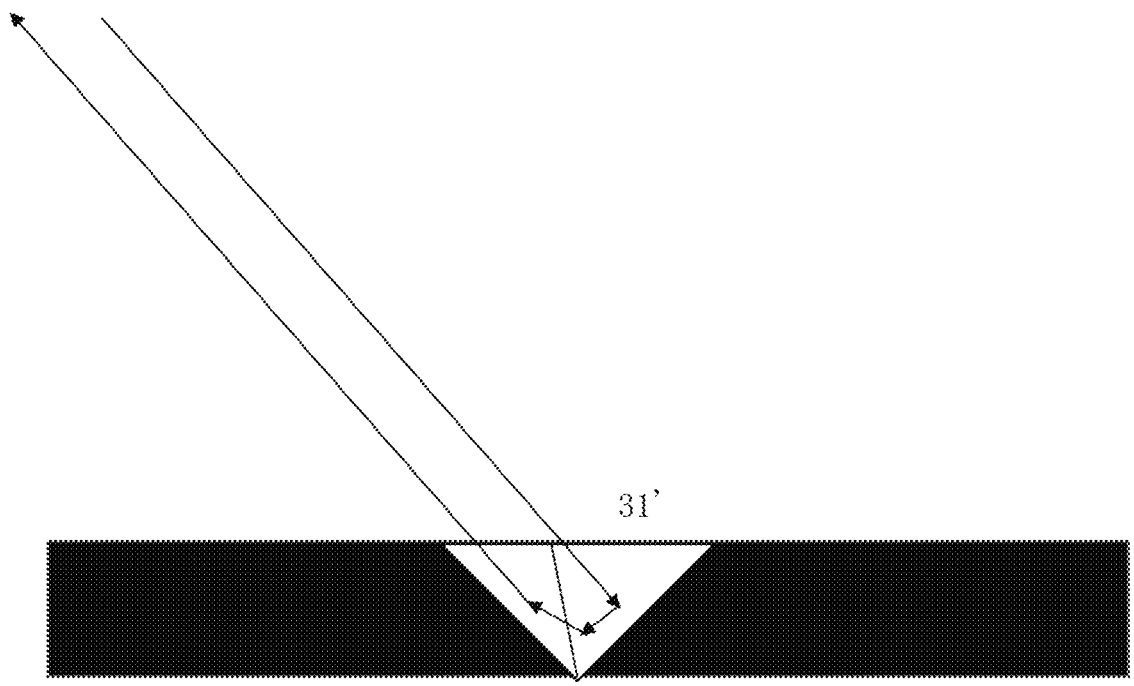

In another embodiment, the right-angle vertex microstructure 31' may be a recess formed by imprinting a portion of one of the vertices of the above microstructured body on the substrate 30 (see FIG. 6C).

FIGS. 6A, 6B, and 6C show an enlarged view of the right-angle vertex microstructure and a schematic view of the retroreflective path in FIG. 5. In the embodiments shown in FIGS. 6A and 6B, the right-angle vertex microstructure 31' is a transparent microstructured body. Light rays are refracted from the transflector through an incident surface (e.g., an upper surface) of the right-angle vertex microstructure 31' to irradiate toward a highly reflective coating of a film or curtain 30. After being reflected three times, the light rays irradiate back onto the incident surface (for example, the upper surface) of the right-angle vertex microstructure 31', and are refracted again to irradiate towards the transflector. In the embodiment shown in FIG. 6C, the right-angle vertex microstructure 31' is a depression, and after being transmitted through or reflected by the transflector, the light rays are directly incident on the depression, and are then reflected three times, before irradiating towards the transflector. The right-angle vertex microstructure 31' is structured so that the light rays can be returned to the transflector almost via the original path (likewise, it can be considered that the light rays, when viewed in a macroscopic environment, are returned just along the original path).

Figure 7:
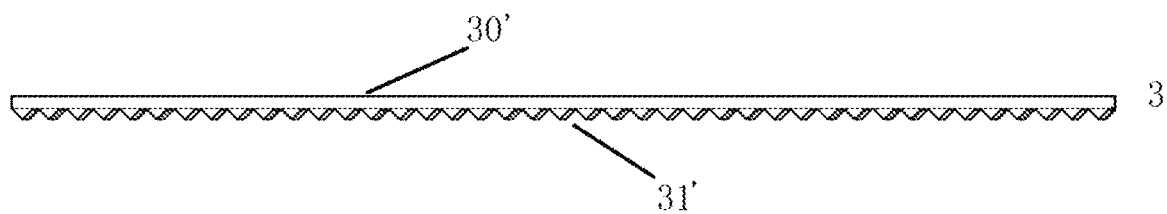
FIG. 7 schematically shows a retroreflective element according to yet another embodiment of the present invention.

FIG. 7 shows a retroreflective element according to yet another embodiment of the present invention. Right-angle vertex microstructures 31' is uniformly distributed on the substrate 30' of the retroreflective element 3. The substrate 30' itself is a transparent substrate, and the right-angle vertex microstructure 31' is also a transparent microstructured body. The faces of the right-angle vertex microstructure 31 that departs from the substrate 30' are coated with a highly reflective coating.

The right-angle vertex microstructure 31' is preferably formed integrally with the substrate 30', and certainly, can also be produced separately and then attached to the substrate 30'. In preferred cases, the material of the substrate 30' and the material of the right-angle vertex microstructure 31' are identical, or at least have a same refractive index.

Figure 8:
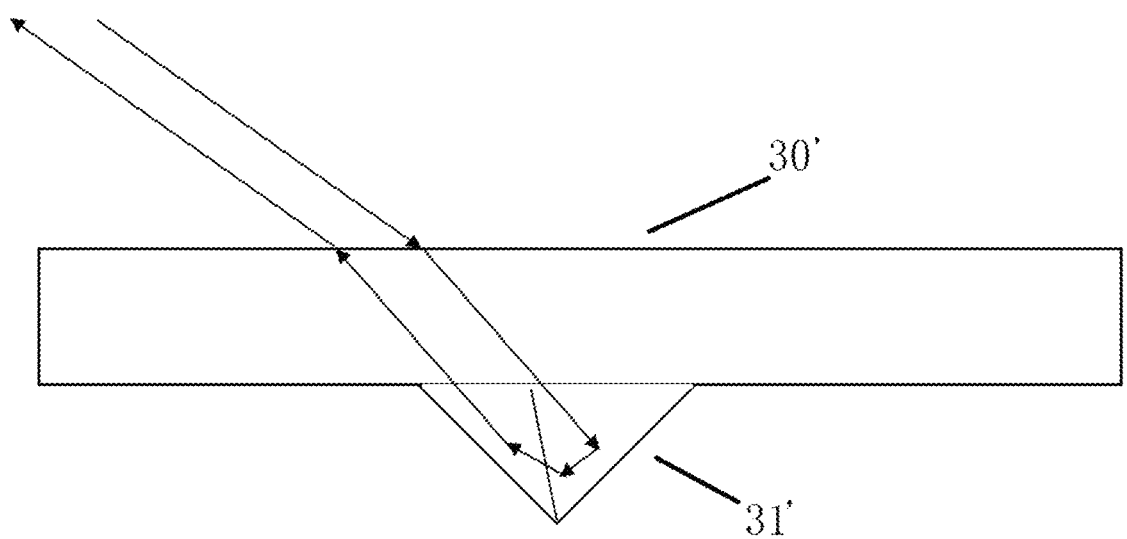
FIG. 8 schematically shows a microstructure of a retroreflective element and a retroreflective path according to yet another embodiment of the present invention.

FIG. 8 shows an enlarged view of the right-angle vertex microstructure and a schematic diagram of the retroreflective path in FIG. 7. Light rays are refracted from the transflector through an upper surface of the substrate 30' to irradiate towards a highly reflective coating of the right-angle vertex microstructure 31'. After being reflected three times, the light rays irradiate back onto the upper surface of the substrate 30' and are refracted again to irradiate towards the transflector. The right-angle vertex microstructure 31' is structured so that the light rays can be returned to the transflector almost via the original path (as previously described, it can be considered that the light rays, when viewed in a macroscopic environment, are returned just along the original path).

Figure 9:
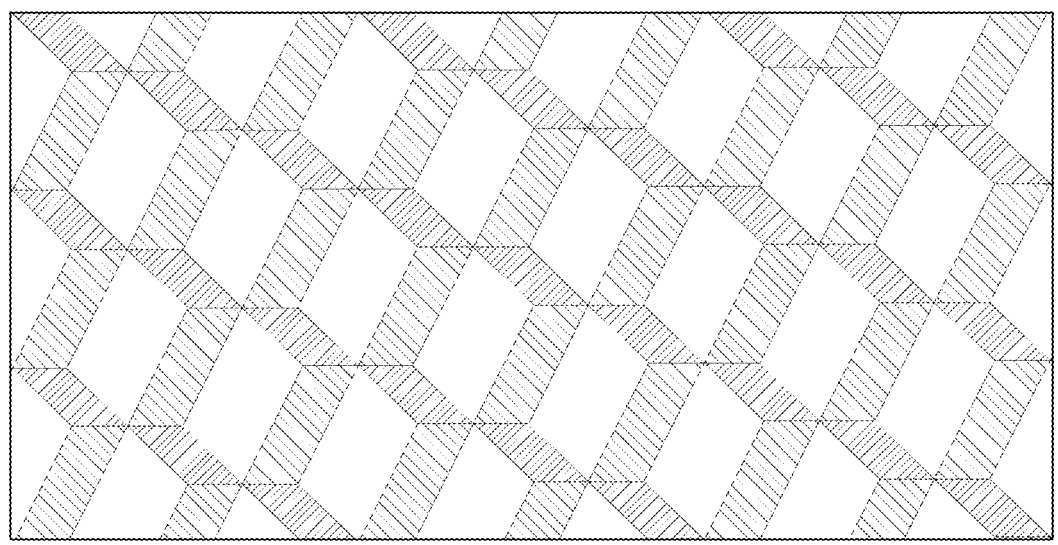
FIG. 9 schematically shows a top view of distribution of a microstructure of a retroreflective element according to an embodiment of the present invention.

FIG. 9 schematically shows the top view of distribution of microstructures on the retroreflective element according to one embodiment of the present invention, to better understand the distribution of the microstructures. As shown, a plurality of microstructures are distributed by turns in proximity to one another, and extend over the retroreflective elements. It is to be understood that, FIG. 9 shows only a part of the retroreflective elements and the microstructures may be distributed over the entire retroreflective element. In addition, although the microstructures shown in FIG. 9 are depressions similar to cuboids, it should be understood that the shape of the microstructures is not limited thereto, and may be any of the microstructures described above.

It should be appreciated that, in the present invention, although a reflective face (e.g., a face coated with a highly reflective coating) of the retroreflective element is described as being a portion attached to the substrate in most cases, it can also be considered that the reflective face is a portion attached to the microstructure. For example, the retroreflective element may be divided into a large number of retroreflective units each of which includes a microstructure with a reflective face; the microstructure can be a spherical microstructure or a right-angle vertex microstructure as described above; or, the reflective face can even also be described as a separate structure unit. For example, the retroreflective units each include a reflective face, and the reflective face can be attached to at least one of the first material and the second material thereon; and the reflective face can be formed by one or more faces of the aforementioned microstructure.

According to the embodiments of the present invention, it is possible to directly image in the air, even in vacuum, without depending on auxiliary equipment such as helmet, or on an imaging screen or a particulate medium in the air. The embodiments of the present invention relate to an air imaging technology in a true sense. Since the generated image suspends in the air, a lot of interactions and applications can be extended, which is of an epoch-making significance.

It is to be understood that the foregoing description of the disclosed embodiments will enable those skilled in the art to realize or use the present invention. It is to be understood that, the features disclosed in the above embodiments may be used alone or in combination, unless otherwise specified. Modifications to these embodiments will be readily apparent to those skilled in the art. General principles defined in the present disclosure can be implemented in other embodiments, without departing from the spirit or scope of the present invention. Accordingly, the invention disclosed herein is not limited to the specific embodiments disclosed, but is intended to cover modifications within the spirit and scope of the invention as defined by the appended claims.

The invention claimed is:

1. A system for imaging in the air, comprising:
   an image source,
   a transflector,
   a first retroreflective element, and
   a second retroreflective element,
   wherein an orthographic projection of the first retroreflective element on a plane where the transflector is located and an orthographic projection of the second retroreflective element on the plane where the transflector is located are overlapped;
   a plurality of light rays emitted by the image source are directly irradiated on the transflector and reflected by the transflector to irradiate on the first retroreflective element, and the plurality of light rays, which are irradiated on the first retroreflective element, are subjected to reflection on the first retroreflective element to propagate along an original incident path in an opposite direction, and be directly incident onto the transflector, and then to be transmitted through the transflector to form a first real image at a viewing side of the system;
   an orthographic projection of the first retroreflective element on the plane where the transflector is located at least partially overlaps the transflector; and
   additionally, the plurality of light rays emitted by the image source are directly irradiated on the transflector and transmitted through the transflector to irradiate on the second retroreflective element, and the plurality of light rays, which are irradiated on the second retroreflective element, are subjected to reflection on the second retroreflective element to propagate along an original incident path in an opposite direction and be directly incident on the transflector, and then the plurality of light rays, which are incident on the transflector, are reflected by the transflector to form a second real image at the viewing side of the system.

2. The system of claim 1, wherein each of the first retroreflective element and the second retroreflective element comprises a plurality of retroreflective units.

3. The system of claim 2, wherein the retroreflective units comprise a microstructure with a reflective face.

4. The system of claim 3, wherein the microstructure is a right-angle vertex microstructure made of a transparent material, wherein the right-angle vertex microstructure has at least one right-angle vertex whose three edges are at right angles to each other, and three faces formed in a manner that the three edges intersect each other or at least their partial regions form the reflective face.

5. The system of claim 4, wherein a face other than the reflective face of the microstructure is attached to or formed integrally with a transparent substrate, wherein the substrate can be used to carry the retroreflective units; the three edges of the right-angle vertex are of equal length.

6. The system of claim 3, wherein the microstructure is a recess containing a right-angle vertex microstructure, wherein the right-angle vertex microstructure has at least one right-angle vertex whose three edges are at right angles to each other, and three faces formed in a manner that the three edges intersect each other or at least their partial regions form the reflective face.

7. The system of claim 3, wherein the microstructure is a spherical microstructure made of a transparent material, wherein a partial surface of the spherical microstructure, more distant from the transflector, forms a reflective face.

8. The system of claim 3, wherein the reflective face of the microstructure is attached to or formed integrally with a substrate, wherein the substrate can be used to carry the retroreflective units.

9. The system of claim 2, wherein the retroreflective units comprise at least one of a first material and a second material, and the retroreflective units further comprise a reflective face, wherein,
   the first material is a transparent solid material;
   the first material, as viewed from an incident path of the light rays, is positioned in front of the reflective face, and the light rays are incident through the first material and then are reflected on the reflective face, before being further emitted from the first material;
   and the second material, as viewed from the incident path of the light rays, is positioned rearward of the reflective face.

10. The system of claim 9, wherein the second material is a film, a curtain or a plate.

11. The system of claim 9, wherein the reflective face is three faces formed in a manner that three edges of a right-angle vertex intersect each other or at least their partial regions, wherein the three edges of the right-angle vertex are at right angles to each other; among the three edges of the right-angle vertex, the length of the longest edge does not exceed 10 times that of the shortest edge.

12. The system of claim 9, wherein the reflective face is a part of a surface of a sphere, and the center of the sphere is positioned in front of the reflective face, as viewed from the incident path of the light rays.

13. The system of claim 2, wherein the retroreflective units comprise a first material and a second material, and the retroreflective units further comprise a reflective face, wherein,
the first material is air or vacuum, and the second material is a film, a curtain or a plate;
the first material, as viewed from an incident path of the light rays, is positioned in front of the reflective face, and the light rays are incident through the first material and then are reflected on the reflective face, before being further emitted from the first material;
and the second material, as viewed from the incident path of the light rays, is positioned rearward of the reflective face.

14. The system of claim 1, wherein each of the first retroreflective element and the second retroreflective element has a curvature bent toward the transflector.

15. The system of claim 1, wherein each of the first retroreflective element and the second retroreflective element comprises a substrate with a reflective face and microstructures uniformly disposed on the substrate; a reflectivity of the reflective face is larger than 90%.

16. The system of claim 15, wherein each microstructure is a right-angle vertex microstructure made of a transparent material, wherein the right-angle vertex microstructure has at least one right-angle vertex whose three edges are at right angles to each other; the microstructures and the substrate are integrally formed by a same transparent material, the right-angle vertex protrudes outwardly and the reflective face is formed on three planes formed in a manner that the three edges of the right-angle vertex intersect each other.

17. The system of claim 15, wherein each microstructure is a recess containing a right-angle vertex microstructure, wherein the right-angle vertex microstructure has at least one right-angle vertex whose three edges are at right angles to each other.

18. The system of claim 15, wherein each microstructure is a spherical microstructure made of a transparent material.

19. The system of claim 15, wherein the reflective face is formed on a face of the substrate facing the microstructures, or is formed at an interface of the substrate and the microstructures.

20. The system of claim 1, wherein each of the first retroreflective element and the second retroreflective element comprises a substrate and a plurality of microstructures on the substrate, the substrate and the plurality of microstructures are integrally formed by a same material; the plurality of microstructures are at a side of the substrate away from the transflector.

21. The system of claim 20, further comprising a reflective coating,
wherein the reflective coating is at a surface, that is away from the substrate, of each of the plurality of microstructures;
light that is irradiated on the each of the first retroreflective element and the second retroreflective element is refracted by a surface, that is away from the plurality of microstructures, of the substrate to be irradiated on and reflected by the reflective coating, light that is reflected by the reflective coating is irradiated on and refracted by the surface, that is away from the plurality of microstructures, of the substrate and then propagated toward the transflector.

22. The system of claim 21, wherein each of the first retroreflective element and the second retroreflective element is a curved retroreflective element, and a center of the curved retroreflective element is at a side of an edge of the curved retroreflective element away from the transflector.

23. The system of claim 1, wherein each of the first retroreflective element and the second retroreflective element comprises a substrate and a plurality of microstructures on the substrate;
each microstructure is a right-angle vertex microstructure made of a transparent material;
the right-angle vertex microstructure comprises at least one right-angle vertex, and three edges, that intersect at the at least one right-angle vertex, of the right-angle vertex microstructure are at right angles to each other; and
the transflector is made of one or more selected from PC resin, PET resin, PMMA resin, glass, quartz; a transmittance of the transflector is 50%; a reflectance of the transflector is 50%.

* * * * *